(12) United States Patent
Strate

(10) Patent No.: US 11,919,437 B2
(45) Date of Patent: Mar. 5, 2024

(54) ADJUSTMENT SYSTEM FOR VEHICLE LAMP

(71) Applicant: Flex-N-Gate Advanced Product Development, LLC, Windsor (CA)

(72) Inventor: Colin Strate, Northville, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 17/930,995

(22) Filed: Sep. 9, 2022

(65) Prior Publication Data
US 2023/0080944 A1 Mar. 16, 2023

Related U.S. Application Data

(60) Provisional application No. 63/242,521, filed on Sep. 10, 2021.

(51) Int. Cl.
*B60Q 1/068* (2006.01)
*F21S 41/39* (2018.01)
*F21S 41/675* (2018.01)

(52) U.S. Cl.
CPC .............. *B60Q 1/068* (2013.01); *F21S 41/39* (2018.01); *F21S 41/675* (2018.01); *B60Q 2200/36* (2013.01)

(58) Field of Classification Search
CPC ...... F21S 41/39; F21S 41/675; B60Q 1/0683; B60Q 1/0686; B60Q 2200/32; B60Q 2200/36; B60Q 1/068
See application file for complete search history.

(56) References Cited

U.S. PATENT DOCUMENTS

| 5,673,991 | A | 10/1997 | Eickhoff et al. | |
| 7,118,259 | B2 | 10/2006 | Fladhammer | |
| 8,215,805 | B2 | 7/2012 | Cogliano et al. | |
| 9,475,421 | B2 | 10/2016 | Burton | |
| 10,195,981 | B1 | 2/2019 | Wu | |
| 10,960,808 | B2 | 3/2021 | Li et al. | |
| 10,962,211 | B2 | 3/2021 | King | |
| 2016/0159271 | A1* | 6/2016 | Helwig | B60Q 1/0683 362/463 |
| 2019/0176682 | A1* | 6/2019 | Seiger | B60Q 1/1423 |
| 2022/0107050 | A1* | 4/2022 | Fladhammer | F16M 11/10 |

FOREIGN PATENT DOCUMENTS

EP 2865567 A1 * 4/2015 .......... B60Q 1/0483

OTHER PUBLICATIONS

U.S. Appl. No. 63/198,224, filed 2020.*

* cited by examiner

*Primary Examiner* — Alicia M Harrington
*Assistant Examiner* — Steven Y Horikoshi
(74) *Attorney, Agent, or Firm* — AVEK IP, LLC

(57) ABSTRACT

Disclosed is a system enabling micro-adjustments in headlamps having upper and lower modules. A link exists between the upper and lower modules, the length of the link is made to be adjustable. The lower module is located on a pivot so that adjustments made to the length of the link result in a desired lighting pattern.

20 Claims, 4 Drawing Sheets

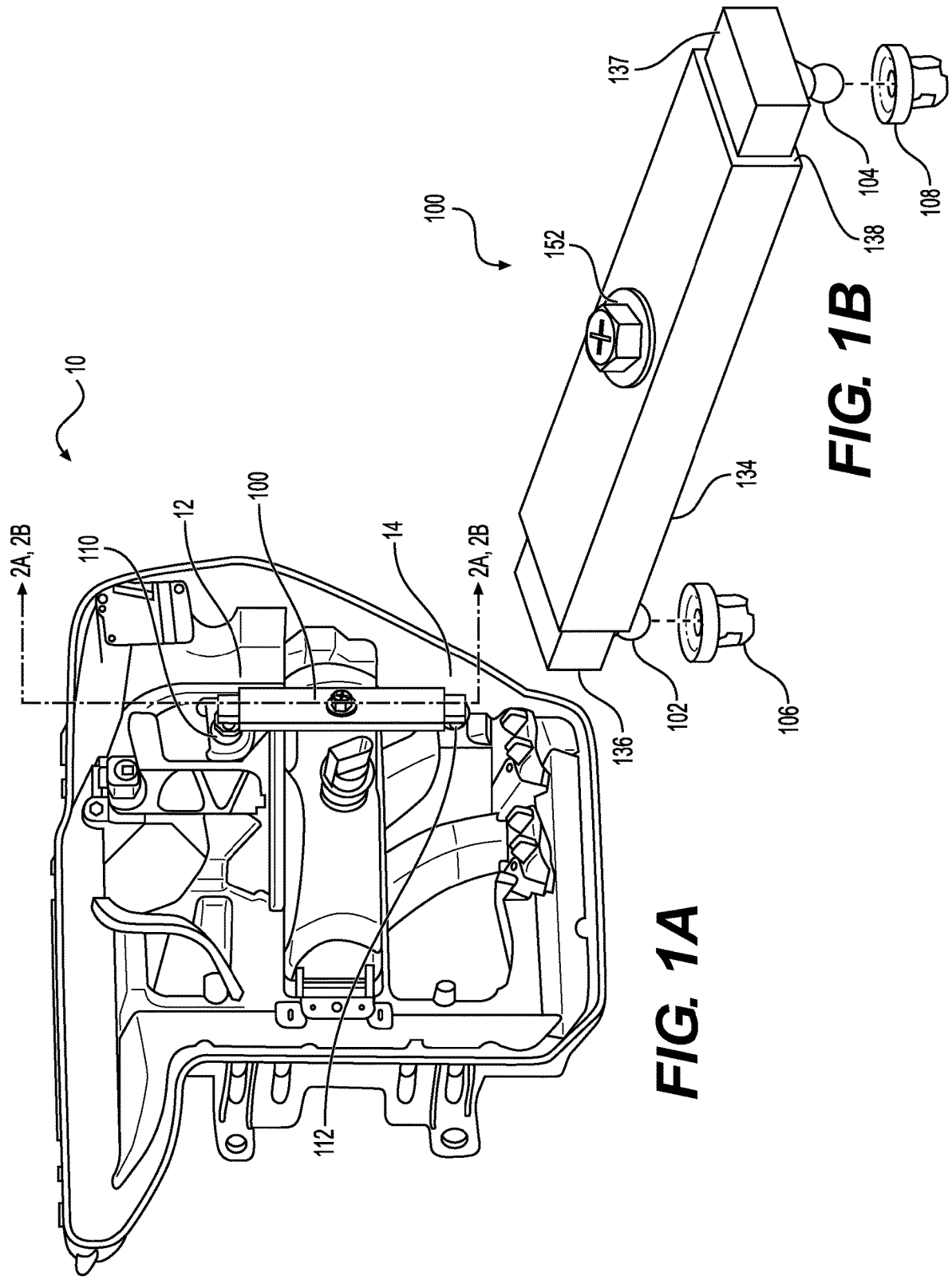

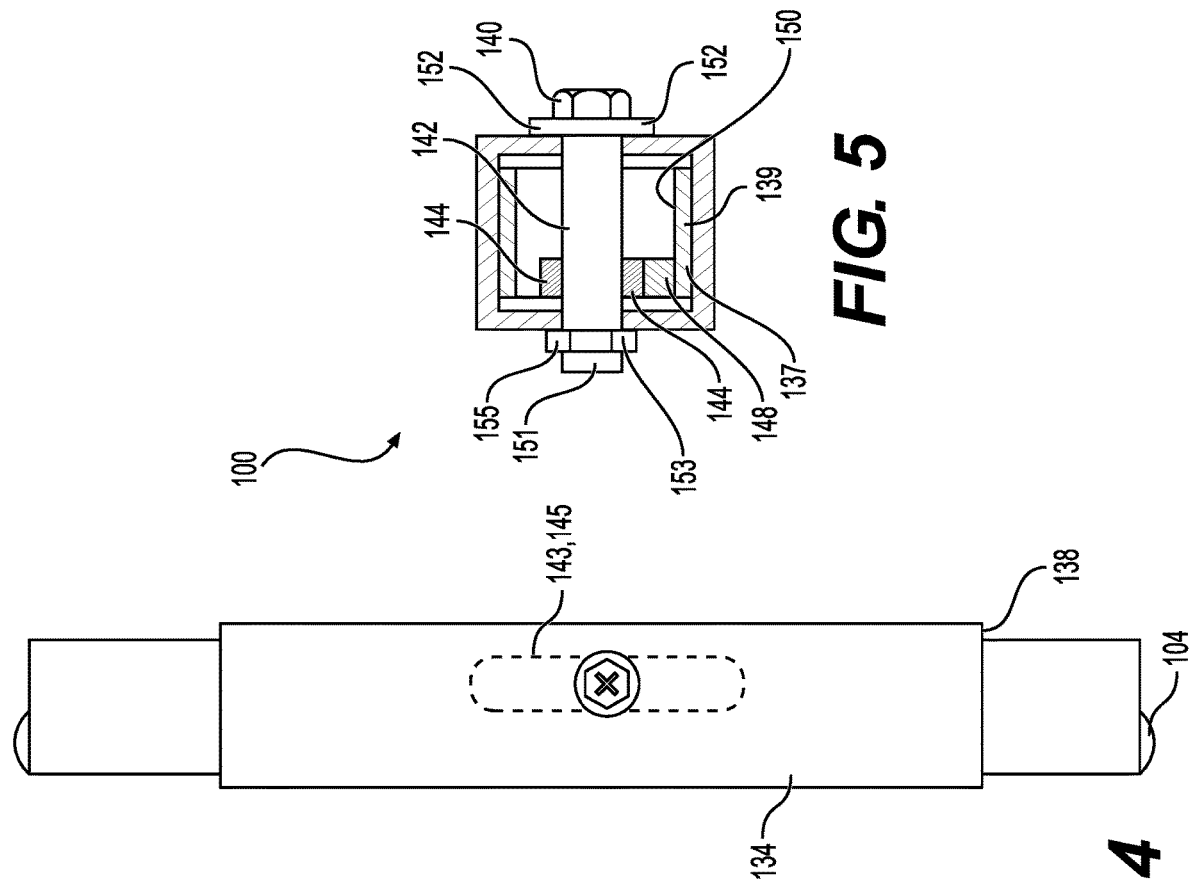
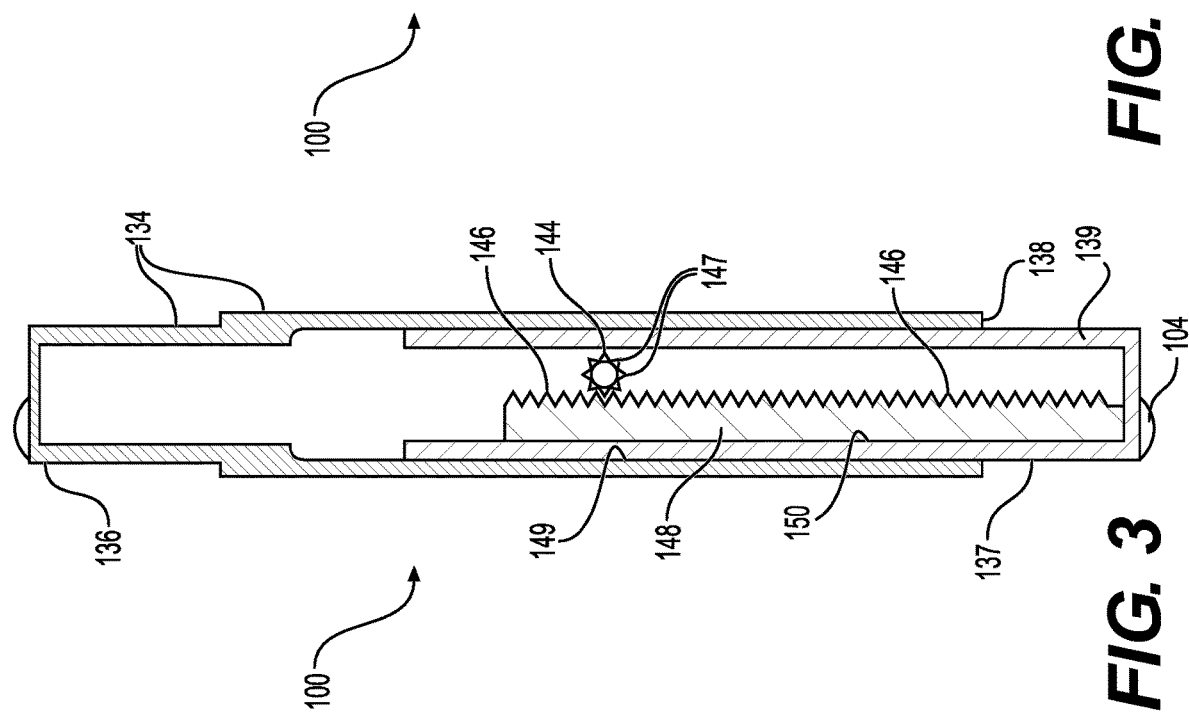

ADJUSTMENT SYSTEM FOR VEHICLE LAMP

CROSS-REFERENCE TO RELATED APPLICATIONS

This application claims the benefit of U.S. Provisional Patent Application No. 63/242,521, filed Sep. 10, 2021, the entire contents of which are herein incorporated by reference.

BACKGROUND OF THE INVENTION

1. Field

The disclosed embodiments relate generally to the field of vehicle illumination systems. More specifically, the disclosed embodiments relate to systems and methods for pivotally adjusting light-configuration modules to obtain an optimal emitted pattern.

2. Description of the Related Art

Vehicle headlamps which provide both high and low beams are well known in the art. Some of these headlamps have an upper module that creates a low-beam light pattern ahead of the vehicle, including a cut line, as well as a lower module that creates a high-beam pattern.

It is also known to rigidly link the upper and lower modules, and then provide adjustments. U.S. Pat. No. 9,475,421 to Burton discloses a rigid link bracket connecting an upper reflector and a lower reflector within a headlamp assembly. See FIG. 1 in Burton. Burton further discloses the link bracket may connect to reflectors via ball sockets. Burton discloses the link bracket may synchronize the rotation of the reflectors.

Other publications disclose ways to adjust headlamp U.S. Pat. No. 10,195,981 to Wu discloses an adjusting unit operably connected to a mounting seat and a plurality of light emitting units. Additional prior art references were located which disclose the use of different aiming systems that do not involve the use of a linkage arm between lighting systems. These references include U.S. Pat. No. 7,118,259 to Fladhammer, U.S. Pat. No. 8,215,805 to Cogliano et al., U.S. Pat. No. 10,962,211 to King, and U.S. Pat. No. 10,960,808 to Li et al.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to an illumination system for a vehicle, the system including: a first light-configuring device; a second light-configuring device; a length-adjustable link connected between the first and second light-configuring devices, the length-adjustable link establishing a first connection at a first location on the of the first light-configuring device, the length-adjustable link establishing a second connection at a second location on the second light-configuring device; the second light-configuring device being pivotally attached at a pivot location, the pivot location not being in line with the first and second locations on the first and second light-configuring devices; and an adjustment of an overall length of the length-adjustable link changing a lighting pattern emitted by the second light-configuring device.

In some aspects, the techniques described herein relate to a system wherein each of the light-configuring modules includes a reflector.

In some aspects, the techniques described herein relate to a system wherein each of the first and second connections are ball connections.

In some aspects, the techniques described herein relate to a system wherein each of the first and second connections are made into sockets which are connected to the first and second pivot locations.

In some aspects, the techniques described herein relate to a system wherein each of the sockets at the first and second locations are made into rearwardly-extending tubes on the first and second modules.

In some aspects, the techniques described herein relate to a system wherein a screw-adjustment arrangement is used to pivot the first lighting module to a first-module angular position, and a second-module angular position using the length-adjustable link.

In some aspects, the techniques described herein relate to a system wherein a lengthening of the adjustable link results in a clockwise adjustment in the second module, and a shortening of the length-adjustable link results in a counter-clockwise adjustment being made by the second module.

In some aspects, the techniques described herein relate to a system wherein the system is configured to cause the second light module to remain in place after an adjustment made by a user.

In some aspects, the techniques described herein relate to a system wherein the length-adjustable link includes: an inner translatable member included in an outer sleeve; an externally actuated gear configured to drive reciprocating teeth existing on an elongated gear-driven bar which is secured to and extends along an inner wall of the inner translatable member.

In some aspects, the techniques described herein relate to a system wherein a length of the length-adjustable link is made adjustable using one of a rack and pinion, a worm gear arrangement, a helical gear, or a bevel gear.

In some aspects, the techniques described herein relate to a headlight including: an low-beam light module including a low-beam-pattern-configuring component; a high-beam light module including a high-beam-pattern-configuring component; and a linking member pivotally connected between a rear portion of the low-beam light module and a rear portion of the high-beam module, the linking member being configured to increase or decrease in length to change an angular relationship of one of the low-beam or high-beam light modules relative to vertical.

In some aspects, the techniques described herein relate to a system wherein the low-beam-pattern-configuring component is a reflector.

In some aspects, the techniques described herein relate to a system wherein the high-beam-configuring component is a reflector.

In some aspects, the techniques described herein relate to a system wherein a screw-adjustment arrangement is used to increase or decrease in length to change an angular relationship of one of the low-beam or high-beam light modules relative to vertical.

In some aspects, the techniques described herein relate to a system wherein a lengthening of the linking member results in a clockwise adjustment of the high-beam light module, and a shortening of the length-adjustable link results in a counter-clockwise adjustment being made of the high-beam-light module.

In some aspects, the techniques described herein relate to a system wherein the system is configured to cause the first light module to remain stationary as the high-beam light module is being adjusted.

In some aspects, the techniques described herein relate to a system wherein the second light module, after being adjusted to remain in place after an adjustment has been made by a user, is caused to remain in the adjusted position by a frictional relationship established by a screw-adjustment system.

In some aspects, the techniques described herein relate to a system wherein a length of the linking member is made adjustable using one of a rack and pinion, a worm gear arrangement, a helical gear, or a bevel gear.

In some aspects, the techniques described herein relate to a method for adjusting a first lighting module relative to a second lighting module to create a desired lighting pattern, the method including: connecting the first module to the second module using a structural link; making a preliminary adjustment of the first module into a stationary position; and adjusting an angular position of the second module about a pivot by increasing or decreasing the length of the link.

In some aspects, the techniques described herein relate to a method including: causing a vehicle low-beam pattern to be emitted from the first module; and causing a vehicle high-beam pattern to be emitted from the second module.

BRIEF DESCRIPTION OF THE SEVERAL VIEWS OF THE DRAWINGS

Illustrative embodiments are described in detail below with reference to the attached drawing figures, which are incorporated by reference herein and wherein:

FIG. 1A is a perspective view for an embodiment of a headlamp viewed from behind;

FIG. 1B is a perspective view of the adjustable link removed from the view in FIG. 1A;

FIG. 3 is a view taken at Section 3-3 shown in FIG. 2A, which is along the length of the adjustable link;

FIG. 4 is taken at Section 4-4 shown in FIG. 2A with the adjustable link isolated;

FIG. 5 is a sectional taken crosswise to the adjustable link at Section 5-5 shown in FIG. 2B.

Figure 2B:
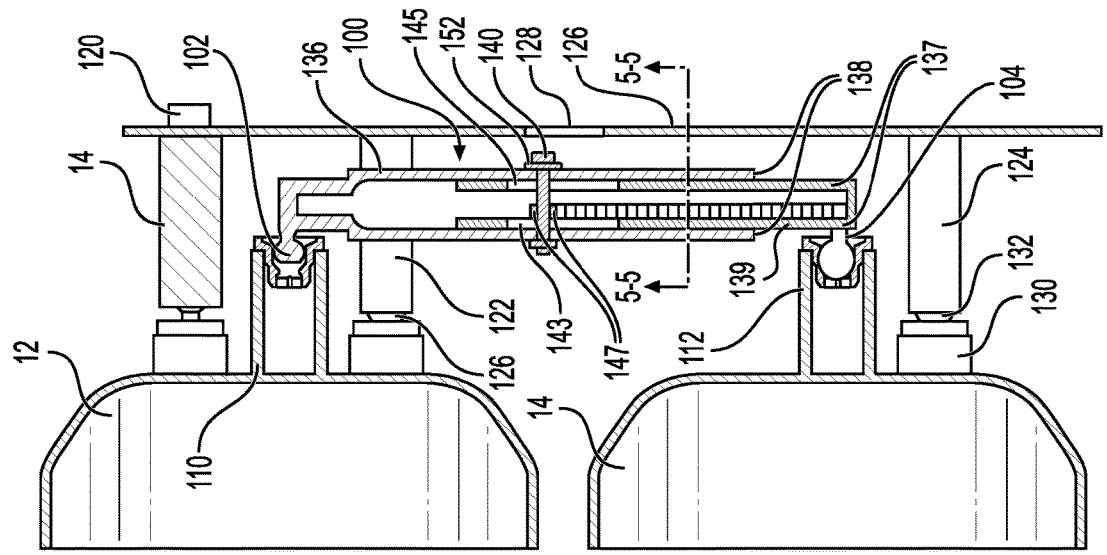
FIG. 2B is a side sectional view of the lighting arrangement for an embodiment shown in an adjusted state.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments provide systems and a method for pivotally adjusting light-configuration modules to obtain an optimal emitted light pattern. In some embodiments, this is accomplished using an adjustable link made between two light-configuring modules. In embodiments, a line created between: (i) a connection point for the adjustable link onto one module; and (ii) a connection point on a second module is offset relative to a pivot point established on one of the two light-configuring modules. It should be noted that the term "link" as used in this application should be interpreted as meaning some means to physically connect, and not be limited to any particular structural configuration unless specifically expressed in claims. It should also be noted that the use of the terms "pivot," "pivotally," "pivotal," or any related terms should be interpreted as allowing for rotation about something. These terms should also not be construed as requiring any sort of dimensional restriction (e.g., as requiring rotation in a plane rather than in three dimensions).

FIG. 1A shows a vehicle headlamp 10 which only one environment in which the systems disclosed herein might be incorporated. The view of the headlight in FIG. 1A is from behind, revealing a view of the reflector arrangement. As can be seen in the figure, the headlamp 10 includes an upper light-configuring module 12 including a light source caused to emit in a particular pattern (using a reflector in embodiments), and a lower light-configuring module 14 (also optionally including a reflector in embodiments). Each of modules 12 and 14 are configured to emit light in a particular pattern, and those patterns are configured to contribute to an overall lighting scheme (e.g., to form a particular lighting pattern in front of a vehicle).

Referring to FIG. 1A, adjustable link 100 is shown, at one end, connecting into the back of the upper light-configuring module 12, and then at the other end, connecting into the back of the lower light-configuring module 14. FIG. 1B reveals that adjustable link 100 makes these connections using a first ball connector 102 at a first end 136, and a second ball connector 104 at a second end 138. Ball connectors 102 and 104 will be received into a first receiving socket 106 and a second receiving socket 108, respectively. Sockets 106 and 108 have both normally been preinstalled (snapped-in, in a known manner) into rearwardly extending structural tube 110 on the upper light-configuring module 12, and a rearwardly-extending structural tube 112 on the lower light-configuring module 14. Alternatively, the sockets 106 and 108 can be snapped onto the ball connectors 102 and 104 before installation.

The ball connection at each ball/socket connection allows for freedom of movement, e.g., each of ball connectors 102 and 104 are free to rotate in each of sockets 106 and 108 Sockets 106 and 108, however, will be rigidly secured into rearwardly-extending tubes 110 and 112. It will be understood to those skilled in the art that numerous other kinds of connection means could be used to establish the connection as well as establish a pivot point. Therefore, the scope of the claims should not be limited to any particular arrangement for connection unless expressed specifically in the claims.

Figure 2A:
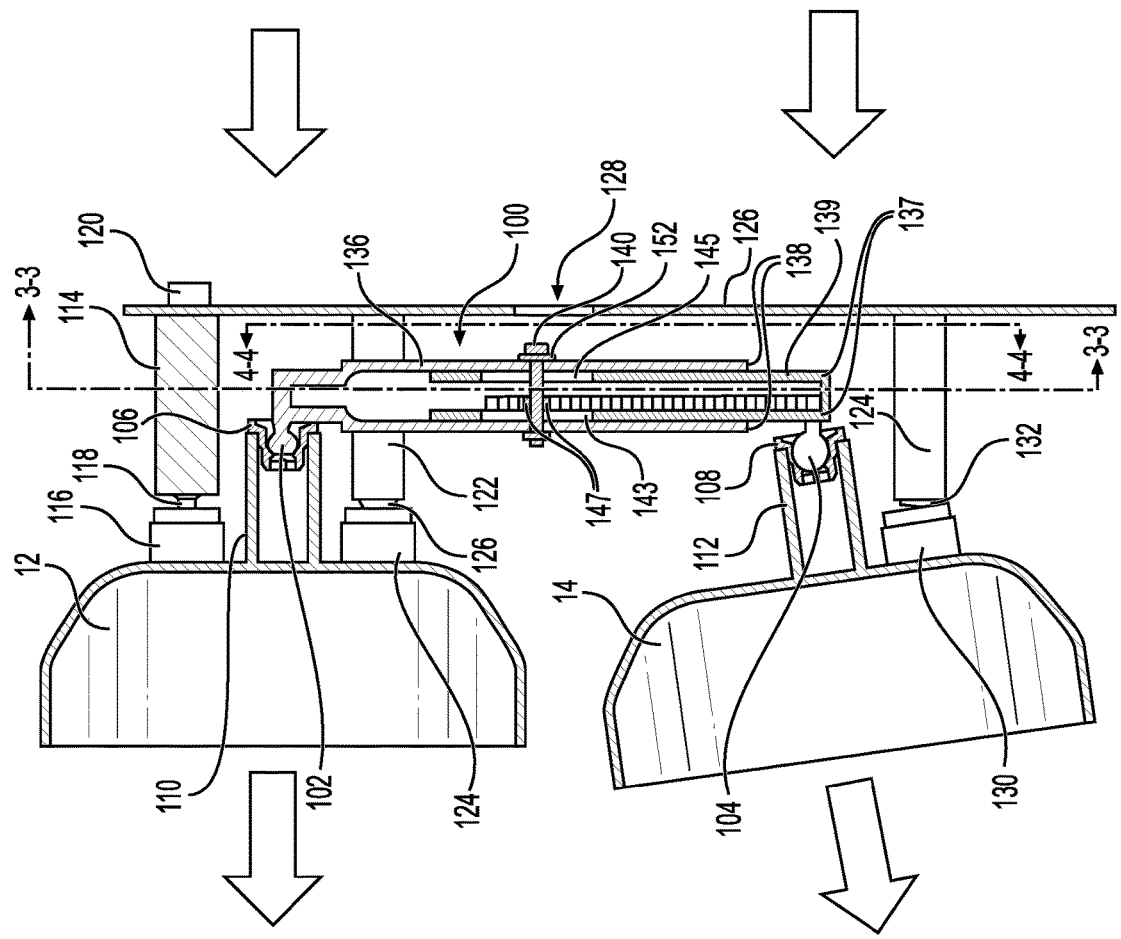
FIG. 2A is a side sectional view of the lighting arrangement for an embodiment shown in a pre-adjusted state.

Referring to FIGS. 2A and 2B, which are sectional drawings taken from Sections 2A and 2B shown in FIG. 1, it can be seen how the adjustable link 100 can correct the angling of lower light-configuring module 14 to properly direct the light-configuring modules such that they create the proper pattern when in use. In the FIG. 2A embodiment, the upper light-configuring module 12 is made adjustable using an upper support member 114 that can be made to move an upper outcropped area 116 outward and inward using a known screw adjustment arrangement system to lengthen the link in a known manner. This conventional system includes a screw connection 118 made between the upper light-configuring module 12 that increases or decreases the gap existing between the upper outcropped area 116 and the support member 114 when a screwdriver (or other device) is used to actuate a screw head end 120.

It is assumed that this adjustment of upper module 12 has already been made using the screw connection 114, or that the angular position of the upper light-configuring module 12 is already correct in starting the overall process of adjusting the lower light-configuring module 14, since the upper light-configuring module 12 will remain stationary during adjustments made using the adjustable link 100. This is ensured since the position of the upper outcropped area 116 has fixed the adjustment of the screw connection 118, and thus, the upper light-configuring module 12 is secured against any rotation in the vertical plane of the FIG. 2A cross section.

As can be seen in the side sectional views of FIGS. 2A and 2B, the longitudinal axis of the adjustable link 100 is offset relative to a pivot point 132 of the lower light-configuring module 14. Thus, this creates the desired adjustment of the lower light-configuring module 14 relative to the upper light-configuring module 12 (in either clockwise or counter-clockwise directions referencing FIGS. 2A and 2B).

At a lower portion on the back of the upper light-configuring module 12, a second rearwardly extending support member 122 is connected to a lower outcropped area 124 by a ball and socket connection 126. The ball connection points at socket 106 and socket 108, since they are not aligned with the pivot point of the lower light-configuring module 14, enable upper light-configuring module 12 angular adjustment relative to vertical. Again, during adjustments made to the lower light-configuring module 14 using the adjustable link 100, the upper light-configuring module 12 will remain stationary and not pivot.

As can be seen in FIGS. 2A and 2B, support members 114, 122, as well as a support member 124 for the lower light-configuring module 14 are all rigidly connected to a stationary frame member 126 (which has been removed in FIG. 1A to reveal internals). The stationary frame member 126 includes an aperture 128 which allows passage of a screwdriver or other device therethrough to actuate a hex bolt head 140, which traverses through the adjustable link 100 (discussed below and shown in FIG. 5). The lower support member 124 is connected to an outcropped portion 130 by the pivot point 132 for the lower module 14. In one embodiment, the pivot point 132 may comprise a ball and socket joint. Again, many different connection means could be used to establish pivot point 132, e.g., snap and other arrangements. Said pivot point 132 allows for the clockwise or counter-clockwise rotation of the lower light-configuring module 14 (in the side view shown in FIGS. 2A and 2B) in order to properly adjust the aim to what is desired. Again, upper light-configuring module 12 remains stationary in this process, and it is assumed that upper light-configuring module 12 has already been caused to be in proper position using the adjustment system provided for it (including the screw head 120 and the screw connection 118). Again, the adjustment system for the upper light-configuring module 12 is known in the art.

The overall arrangement enables the lower light-configuring module 14 to rotate either clockwise or counterclockwise about the pivot point 132, and then remain in place when properly aligned due to a frictional relationship established in the adjustable link 100 that prevents movement unless the device is activated by a user.

Figure 6:
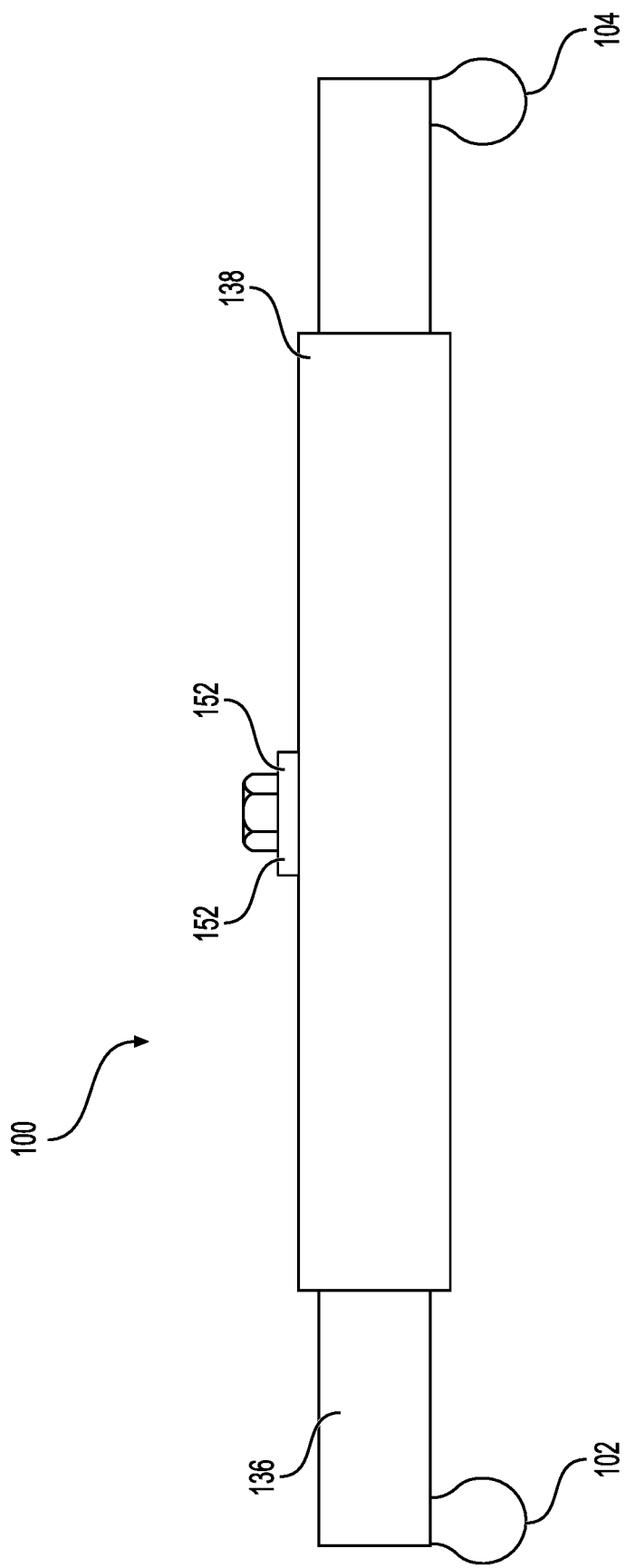
FIG. 6 is a side view of the adjustable link shown removed and from the side.

The details of the adjustable link 100 are shown in FIGS. 3, 4, 5, and 6. FIG. 3 is taken at Section 3-3 shown in FIG. 2A, which is along the length of the adjustable link 100. FIG. 4 is taken at Section 4-4 shown in FIG. 2A. Both of FIGS. 3 and 4 eliminate any components in FIG. 2A that are not a part of the adjustable link 100. FIG. 5 is taken crosswise to the adjustable link 100 at Section 5-5 shown in FIG. 2B. FIG. 6 shows the adjustable link 100 removed and from the side.

Referring first to FIG. 3, it can be seen that the adjustable link 100 includes an outer sleeve 134, which, in the disclosed embodiment, is closed at the first end 136, and is open at the second end 138. The adjustable link 100 has a rectangularly configured cross section which can be seen in FIG. 5. The inner surfaces 149 of the outer sleeve 134 are sized to receive the outer surfaces 137 of an inner translatable member 139. The inner translatable member 139 is caused to move in and out of the outer sleeve 134 when a driving device (e.g., screwdriver or wrench, not shown) is used to turn the hex bolt head 140 on a bolt 142 (shown in FIG. 5). Rotation of the bolt 142 turns a driving gear 144 in either clockwise or counterclockwise directions.

The bolt 142 passes initially through a first hole made into the outer sleeve 134, then through a first guiding slot 145 made into the inner translatable member 137, is configured to have the driving gear 144, then passes through a second guiding slot 143 on the opposite side of the inner translatable member 137, then through a second hole in the outer sleeve 134. An entry end 151 of the bolt 142 includes a snap ring 153 that is snapped into an annular channel 155 to lock the bolt through the outer sleeve 134 and the inner translatable member 137 The length between the hex bolt head 140 and snap ring 153 is configured to create a frictional relationship that enables the bolt 142 to be turned using a screwdriver (or other device), but resists rotation such that the bolt 142 will remain in place after being driven. The driving gear 144 has teeth 147 that are configured for receipt by reciprocating teeth 146 existing on an elongated gear-driven bar 148. The elongated gear-driven bar 148 is secured to, and extends along an inner wall 150 of the inner translatable member 137. The first guiding slot 145 prevents interference so that the shaft of the bolt 142 does not prevent translation of the inner translatable member 137 in and out of the outer sleeve 134 when the bolt 142 is activated using the hex bolt head 140. The bolt 142 is kept in position relative to the outer sleeve 134 by a cap arrangement 152.

Those skilled in the art will recognize that numerous systems for creating a link between the two headlamp sockets 106 and 108 to create the desired adjustability are known in the art and could be incorporated instead of the rack and pinion arrangement disclosed herein. For example, a worm gear type arrangement, a helical gear, a bevel gear, or any other kind of device capable of extending the distance between two points and then holding a position (once adjusted) could be used instead of the arrangement shown in the figures.

The system above also enables a process for providing lamp adjustment. As a preliminary, the first light module (e.g., lower light-configuring module 14) is configured to have a pivotal relationship (e.g., on a pivot point 132) with respect to a second light module (e.g., upper light-configuring module 12) which is, in embodiments, relatively stationary. Then, an adjustable link (e.g., adjustable link 100) having two connection points (e.g., balls 102 and 104) is connected between the relatively stationary light module (e.g., upper light-configuring module 12) and the light module that is pivotally mounted (e.g., lower light-configuring module 14) such that a line intersecting the connection points (e.g., the centers of balls 102 and 104) is not in line with the pivot point (e.g., pivot point 132) so that rotation is created in the first module (e.g., lower light-configuring module 14).

Using the views in FIGS. 2A and 2B as an example, the state in FIG. 2A is one of vertical misalignment wherein the illumination pattern of lower light-configuring module 14 is directed downward of horizontal. In a situation where an adjustment back to horizontal is desired, a user can, by operating the bolt 142 in a clockwise direction, create slight extension of adjustable link 100 by movement of the inner translatable member 137 away from and out of the outer sleeve 134. This extension increases the distance between connection balls 102 and 104. The increased distance results in a repositioning of the lower light-configuring module 14 in a clockwise direction to horizontal, the corrected state reflected in FIG. 2B.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An illumination system for a vehicle, the system comprising:
a first light-configuring module;
a second light-configuring module;
a length-adjustable link connected between the first and second light-configuring modules, the length-adjustable link establishing a first pivotal connection on the first light-configuring module, the length-adjustable link establishing a second pivotal connection on the second light-configuring module;
the first light-configuring module being pivotally attached relative to a vehicle frame member at a structural pivot location, the structural pivot location not being in line with the first and second pivotal connections on the first and second light-configuring modules; and
an adjustment of an overall length of the length-adjustable link changing a lighting pattern emitted by the first light-configuring module.

2. The system of claim 1 wherein each of the first and second light-configuring modules includes a reflector.

3. The system of claim 1 wherein each of the first and second pivotal connections are ball connections.

4. The system of claim 3 wherein each of the first and second pivotal connections are made into sockets which are connected to the first and second light-configuring modules.

5. The system of claim 4 wherein each of the sockets are made into rearwardly-extending tubes on the first and second light-configuring modules.

6. The system of claim 1 wherein a screw-adjustment arrangement is used to pivot the first light configuring module to a first-module angular position, and a second-module angular position using the length-adjustable link.

7. The system of claim 1 wherein a lengthening of the length-adjustable link results in a clockwise adjustment in the second light-configuring module, and a shortening of the length-adjustable link results in a counter-clockwise adjustment being made by the second light-configuring module.

8. The system of claim 7 wherein the system is configured to cause the second light-configuring module to remain in place after an adjustment made by a user.

9. The system of claim 1 wherein the length-adjustable link comprises:
an inner translatable member included in an outer sleeve; and
an externally actuated gear configured to drive reciprocating teeth existing on an elongated gear-driven bar which is secured to and extends along an inner wall of the inner translatable member.

10. The system of claim 1 wherein a length of the length-adjustable link is made adjustable using one of a rack and pinion, a worm gear arrangement, a helical gear, or a bevel gear.

11. A headlight comprising:
a low-beam light module including a low-beam-pattern-configuring component;
a high-beam light module including a high-beam-pattern-configuring component; and
a linking member pivotally connected between a rear portion of the low-beam light module and a rear portion of the high-beam module, the linking member being configured to increase or decrease in length to change an angular relationship of one of the low-beam or high-beam light modules relative to vertical.

12. The headlight of claim 11 wherein the low-beam-pattern-configuring component is a reflector.

13. The headlight of claim 11 wherein the high-beam-configuring component is a reflector.

14. The headlight of claim 13 wherein a screw-adjustment arrangement is used to increase or decrease in length to change an angular relationship of one of the low-beam or high-beam light modules relative to vertical.

15. The headlight of claim 11 wherein a lengthening of the linking member results in a clockwise adjustment of the high-beam light module, and a shortening of the linking member results in a counter-clockwise adjustment being made of the high-beam-light module.

16. The headlight of claim 15 wherein the headlight is configured to cause the low-beam light module to remain stationary as the high-beam light module is being adjusted.

17. The headlight of claim 16 wherein the high-beam module, after being adjusted to remain in place after an adjustment has been made by a user, is caused to remain in an adjusted position by a frictional relationship established by a screw-adjustment system.

18. The headlight of claim 11 wherein a length of the linking member is made adjustable using one of a rack and pinion, a worm gear arrangement, a helical gear, or a bevel gear.

19. A method for adjusting a first lighting module relative to a second lighting module to create a desired lighting pattern, the method comprising:
   connecting the first module to the second module using a structural link;
   making a preliminary adjustment of the first module into a stationary position; and
   adjusting an angular position of the second module about a pivot by increasing or decreasing a length of the structural link.

20. The method of claim 19 comprising:
   causing a vehicle low-beam pattern to be emitted from the first module; and
   causing a vehicle high-beam pattern to be emitted from the second module.

* * * * *